United States Patent
Zinnabold et al.

(10) Patent No.: US 8,484,843 B2
(45) Date of Patent: Jul. 16, 2013

(54) METHOD AND DEVICE FOR PRODUCING A DISPERSION-HARDENED OBJECT THAT CONTAINS CARBIDE NANOPARTICLES

(75) Inventors: Michael Zinnabold, Burscheid (DE); Marc-Manuel Matz, Friedberg (DE); Marcus Kennedy, Düsseldorf (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 195 days.

(21) Appl. No.: 12/933,181

(22) PCT Filed: Jan. 20, 2009

(86) PCT No.: PCT/EP2009/000325
§ 371 (c)(1),
(2), (4) Date: Dec. 14, 2010

(87) PCT Pub. No.: WO2009/115156
PCT Pub. Date: Sep. 24, 2009

(65) Prior Publication Data
US 2011/0109048 A1    May 12, 2011

(30) Foreign Application Priority Data
Mar. 18, 2008   (DE) .......................... 10 2008 014 800

(51) Int. Cl.
*B21K 1/18* (2006.01)
*C23C 4/10* (2006.01)

(52) U.S. Cl.
USPC ......... 29/888.07; 427/450; 427/577; 428/698

(58) Field of Classification Search
USPC ........... 29/898.07, 88.078; 277/434; 427/228, 427/249.1, 450, 577; 428/698
See application file for complete search history.

(56) References Cited

U.S. PATENT DOCUMENTS

| | | | | |
|---|---|---|---|---|
| 5,549,973 | A * | 8/1996 | Majetich et al. | 428/403 |
| 5,939,146 | A * | 8/1999 | Lavernia | 427/446 |
| 6,723,387 | B1 | 4/2004 | Kear et al. | |
| 2004/0131865 | A1* | 7/2004 | Kim et al. | 428/433 |
| 2005/0112399 | A1* | 5/2005 | Gray et al. | 428/678 |
| 2008/0182114 | A1* | 7/2008 | Kim et al. | 428/469 |
| 2008/0241570 | A1* | 10/2008 | Lawrynowicz et al. | 428/577 |

(Continued)

FOREIGN PATENT DOCUMENTS

| | | |
|---|---|---|
| DE | 19708402 C1 | 8/1998 |
| DE | 10057953 A1 | 6/2002 |
| DE | 102007018859 A1 | 12/2007 |
| EP | 1559807 A | 8/2005 |

*Primary Examiner* — Alexander P Taousakis
(74) *Attorney, Agent, or Firm* — Robert L. Stearns; Dickinson Wright, PLLC

(57) ABSTRACT

A method for producing a dispersion-hardened object which contains carbide nanoparticles comprises producing an object by means of a thermal spraying method, wherein downstream of the combustion chamber, the gas flow is supplied by means of a carrier gas with at least one precursor which reacts in the gas flow to form a carbide, or carbide nanoparticles are supplied via an external nanoparticle generator which is subject to a thermal load. It allows the production of a dispersion-hardened object such as, for example, a component for an internal combustion engine, for example a piston ring. The method is carried out by means of a thermal spraying device which, downstream of the combustion chamber, besides at least one line for supplying a thermal spray powder, further comprises at least one line for supplying a precursor by means of a carrier gas.

12 Claims, 1 Drawing Sheet

U.S. PATENT DOCUMENTS

| | | | |
|---|---|---|---|
| 2010/0119843 A1* | 5/2010 | Sun et al. | 428/426 |
| 2011/0101621 A1* | 5/2011 | Kennedy et al. | 277/444 |
| 2012/0114922 A1* | 5/2012 | Williams et al. | 428/212 |
| 2012/0171469 A1* | 7/2012 | Shmyreva et al. | 428/332 |

* cited by examiner

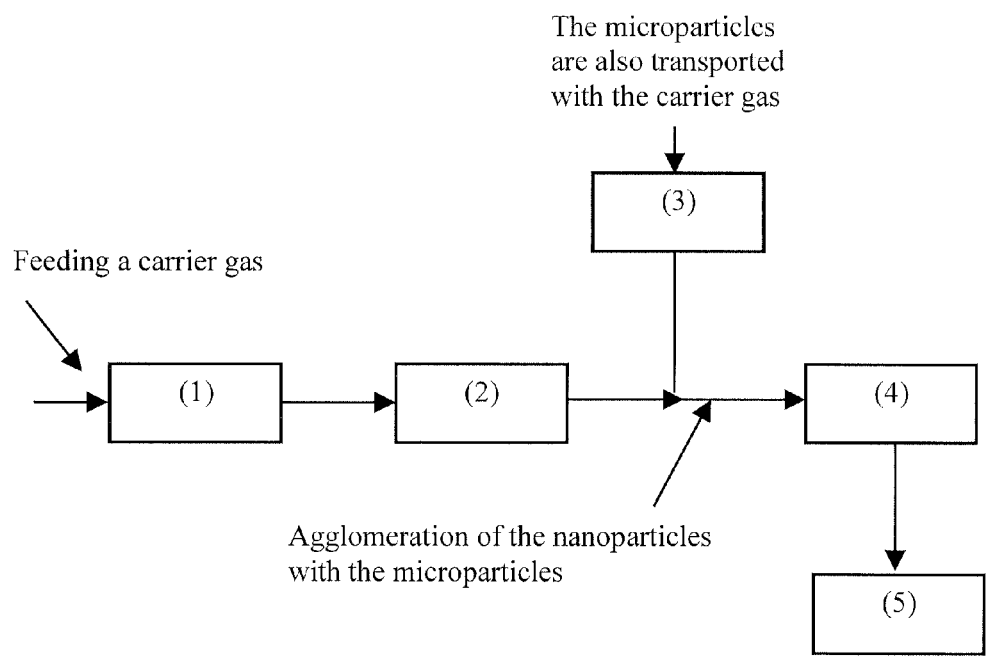

METHOD AND DEVICE FOR PRODUCING A DISPERSION-HARDENED OBJECT THAT CONTAINS CARBIDE NANOPARTICLES

BACKGROUND OF THE INVENTION

1. Technical Field

The present invention relates to a method and a device for producing a dispersion-hardened object which contains carbide nanoparticles. Furthermore, the present invention relates to a dispersion-hardened object which is produced with the method according to the invention such as, for example, a component for an internal combustion engine, preferably a piston ring.

2. Related Art

For piston rings, such as the ones of internal combustion engines with reciprocating pistons, a high wear resistance must be ensured because otherwise, i.e. in case of a low wear resistance, the coating becomes thinner. Thereby, the wall thickness of the piston ring decreases, the sealing effect gets worse, gas leakage and oil consumption increase, and the performance of the engine can get worse. Due to a piston ring that is subject to abrasion, the gap between cylinder wall and piston increases continuously so that it is easier for the combustion gases to escape by passing the piston ring (so-called blow-by) thereby reducing the efficiency of the engine. Furthermore, due to an increased gap, the remaining oil film which is not wiped off becomes thicker so that more oil per time unit can be lost and, thus, the oil consumption is increased.

In the field of thermal spraying of piston rings, today, preferably molybdenum-based materials are used by means of the plasma spraying method. However, the wear rate of the same in highly loaded engines is too high.

The high velocity oxygen fuel thermal spray technology (HVOF) offers the possibility to deposit particles with a low thermal influence and a high kinetic energy onto the substrate in such a manner that dense layers with high adherence are generated. To ensure, in addition, an improved wear resistance at higher loads, more recently, particles from metal carbides such as, for example, WC or $Cr_3C_2$ are used, which can not be sprayed by means of a plasma spraying method because they decompose at the high plasma temperatures of up to 20000° C. or form very brittle phases such as, for example, $W_2C$. Said particles provide indeed a higher wear resistance; however, they have disadvantages due to their physical properties which are different with respect to the substrate, such as lower thermal expansion coefficient and lower thermal conductivity, and different mechanical properties such as lower ductility, i.e. higher brittleness and lower fracture toughness. These disadvantages have an impact during the engine operation, in particular in the range of mixed friction or insufficient lubrication. During these states, the thermal energy which is additionally induced during the friction results in a relaxing process in which the piston ring layer can not follow the expansion of the substrate due to the greatly differing thermal expansion coefficient and thus a network of cracks is generated. This effect results ultimately in a breakdown after repeated loads. Moreover, the metal carbides are usually introduced into a metallic matrix such as, for example, a NiCr alloy, wherein only a wetting of the alloy surface takes place but no metallurgical interlock is obtained. Thereby, the adhesion of the metal carbides such as WC or $Cr_3C_2$, which provide a high wear resistance as areas of hard material, is limited.

To increase the strength of a material, among other things, a dispersion hardening can be carried out. The particles present in this case form barriers for dislocation movements within the material during mechanical load. The dislocations generated and present during loading can not cut through the particles, in fact, they have to bulge between the particles. Dislocation rings are formed which, again, have to be bypassed. When bypassing, a higher energy input is necessary than during cutting. The yield stress for the traveling of the dislocation increases with decreasing particle distance and decreasing particle size. Therefore, the material strength increases as well.

A dispersion hardening would be possible by introducing carbides in the form of nanoparticles. The term "nanoparticles" relates here to particles with a size of 1 to 200 nm. The production of nanocrystalline thermal spray coatings has previously been carried only by means of agglomerated nanoparticles. Such agglomerates of nanoparticles can reach a diameter of 0.1 to 100 µm. Only with particle sizes larger than 1-2 µm, the particle transport under normal pressure conditions is possible. Due to the fact that, for a directed transport in a gas flow, nanoparticles have to absorb a minimum amount of energy through the collision with the gas molecules and that the energy maximally to be absorbed decreases with decreasing particle size, the nanoparticles can be transported in a directed manner only up to a minimum size. This would only be possible through lower process pressures or through electrically charging the particles. In particular at particle sizes below 800 nm, particles behave like gas molecules. A nanocrystalline HVOF layer thus can only be produced if agglomerated nanocrystalline powders are available. A particle reinforcement thus has to be carried out already within the powder. This results in that the generated coating contains microparticles and agglomerates from nanoparticles, but no finely dispersed discrete nanoparticles. Coatings containing agglomerates of nanoparticles are described, for example, in DE 10 2007 018 859 A1, DE 100 57 953 A1, U.S. Pat. Nos. 5,939,146 A, 6,723,387 B1 and US 2004/0131865 A1.

SUMMARY OF THE INVENTION

It is thus the object to provide a method which allows the production of a dispersion-hardened object, in particular a piston ring which contains carbide nanoparticles.

This object is solved according to the invention by a method which comprises the production of an object by means of a thermal spraying method, wherein downstream of the combustion chamber, at least one carbide nanoparticle precursor is supplied to the gas flow by means of a carrier gas, which nanoparticle precursor reacts in the gas flow to form a carbide. Thus, according to the invention, a dispersion strengthening by means of nanoparticles from the gas phase takes place, wherein the nanoparticles are produced in the gas phase and subsequently coagulate with microcrystalline particles of a spray powder and consequently, the further transport of the nanoparticle agglomerates is ensured with the conventional parameters. The carrier gas involves preferably a chemically inert gas. Chemically inert gases comprise, for example, noble gases or nitrogen. Preferably, nitrogen is used.

As carbide nanoparticle precursor, preferably a transition metal halogenide is used. Particularly preferred are inexpensive transition metal chlorides such as, for example, $WCl_6$. Also, elements such as Si, V, W, or titanium can be used which vaporize in an external reactor and react in an atmosphere containing C to form respective carbides.

The thermal energy within the thermal spraying device or an external nanoparticle generator that is subject to thermal load (e.g. a tubular furnace) is utilized to systematically decompose the precursor material or basic material and thus to obtain the desired material as nanoparticle in the gas phase. As thermal spraying method, high velocity oxygen fuel thermal spraying (HVOF) is preferred. The use of an external nanoparticle generator allows the production of nanoparticle-reinforced layer systems and thus components such as, for example, a piston ring.

Also, a chemical reaction of the carbide nanoparticle precursor with a further gas can take place. This can involve a fuel gas or a gas which is added to the carrier gas. Suitable as carbon source is a gaseous hydrocarbon, such as, for example, methane. As reducing agent, for example, hydrogen can be added. An exemplary reaction is illustrated in formula 1.

$$WCl_6 + CH_4 + H_2 \rightarrow WC + 6HCl \qquad (1)$$

However, it is also possible to vaporize metals in an external reactor, e.g. wolfram, titanium, or vanadium by means of an arc between two carbon electrodes, whereby WC would be generated.

The present invention relates further to a dispersion-hardened object which contains carbide nanoparticles and is produced according to the method according to the invention. Said object involves preferably a component for an internal combustion engine, particularly preferred a piston ring.

Finally, the present invention relates to a device for carrying out the method according to the invention. Said device involves a thermal spraying device which, downstream of the combustion chamber, besides at least one line for supplying a thermal spray powder, comprises further at least one line for supplying, by means of a carrier gas, a carbide nanoparticle precursor or nanoparticle produced by means of an external reactor. The line for supplying a carbide nanoparticle precursor by means of a carrier gas is preferably made of graphite which can resist the high temperature of the thermal spray jet. The device involves in particular preferably a device for high velocity oxygen fuel thermal spraying (HVOF).

THE DRAWING

FIG. 1 shows a schematic illustration for producing nanoparticle-reinforced layers by means of thermal spraying and an external nanoparticle generator.

DETAILED DESCRIPTION

The production of nanoparticle-reinforced layer systems by means of HVOF-thermal spraying is possible, for example, by providing nanoparticles in an external reactor (1) in which a material is vaporized in a controlled manner (cf. FIG. 1). The nanoparticles generated in this manner are sintered in a second furnace (2) in the gas flow for specifically setting the particle shape, and agglomerate with the microparticles in the gas flow shortly before the same are fed into the spray gun (4). The line in which the nanoparticles can be transported via a carrier gas can be connected in a simple manner with the line in which the microparticles are transported, for example by means of a T-piece connector. (3) designates a powder conveyor. The obtained substrate is designated with (5).

The invention claimed is:

1. A method for producing a dispersion-hardened object, which contains nanoparticles, by means of thermal spraying using a thermal spraying device including a combustion chamber, comprising the steps of:
   (i) supplying a gas flow downstream of the combustion chamber by means of a carrier gas;
   (ii) supplying at least one carbide nanoparticle precursor to the carrier gas which reacts in the gas flow to form carbide nanoparticles; and
   (iii) thermal spraying the gas flow comprising the carbide nanoparticles.

2. The method according to claim 1, wherein the carbide nanoparticle precursor comprises a transition metal halogenide.

3. The method according to claim 2, wherein the carbide nanoparticle precursor comprises a transition metal chloride.

4. The method according to claim 3, wherein the carbide nanoparticle precursor comprises $WCl_6$.

5. The method according to claim 1, wherein the thermal spraying method comprises high velocity oxygen fuel thermal spraying (HVOF).

6. The method according to claim 1, wherein the carrier gas comprises a hydrocarbon.

7. The method according to claim 6, wherein the hydrocarbon comprises methane.

8. The method according to claim 1, wherein the carrier gas comprises hydrogen.

9. The method of claim 1, wherein the object comprises a piston ring.

10. The method of claim 1 further comprising adding microparticles to the gas flow after step (ii).

11. The method of claim 10 further comprising agglomerating the carbide nanoparticles with the microparticles, and wherein step (iii) includes thermal spraying the gas flow comprising the agglomerated carbide nanoparticles and microparticles.

12. The method of claim 1, further comprising adding a further gas to the gas flow before the carbide nanoparticle precursor reacts in the gas flow.

* * * * *